United States Patent [19]
Goodman et al.

[11] Patent Number: 5,205,386
[45] Date of Patent: Apr. 27, 1993

[54] PAWL AND RATCHET CLUTCH WITH PAWL HOLDBACK

[75] Inventors: Robert B. Goodman, West Hartford, Conn.; Robert Telakowski, Fairlawn, N.J.

[73] Assignee: United Technologies Corporation, Hartford, Conn.

[21] Appl. No.: 846,653

[22] Filed: Mar. 5, 1992

[51] Int. Cl.⁵ .................... F16D 41/12; F16D 43/04
[52] U.S. Cl. ........................... 192/46; 74/576; 192/84 PM; 192/104 C; 192/114 R
[58] Field of Search .......... 192/46, 84 PM, 42, 104 C, 192/114 R; 74/576, 7 C

[56] References Cited

U.S. PATENT DOCUMENTS

| | | | |
|---|---|---|---|
| 2,340,368 | 2/1944 | Dodge | 192/46 X |
| 3,240,304 | 3/1966 | Wickersham | 192/84 PM |
| 3,656,598 | 4/1972 | Goble | 192/114 R X |
| 3,727,733 | 4/1973 | Mrazek | 192/42 |
| 3,791,231 | 2/1974 | Geary | 192/104 C X |
| 4,187,728 | 2/1980 | Mazzorana | 74/6 |
| 4,520,914 | 6/1985 | Kagiyama et al. | 192/84 PM X |
| 4,899,534 | 3/1990 | Sorenson | 60/39.06 |
| 4,914,906 | 4/1990 | Burch | 60/39.142 |
| 4,926,631 | 5/1990 | Sorenson | 60/39.142 |

FOREIGN PATENT DOCUMENTS

| | | |
|---|---|---|
| 3590370 | 10/1986 | Fed. Rep. of Germany . |
| 3620886 | 1/1988 | Fed. Rep. of Germany . |
| 908128 | 10/1962 | United Kingdom .......... 192/84 PM |

*Primary Examiner*—Rodney H. Bonck
*Attorney, Agent, or Firm*—William W. Habelt

[57] ABSTRACT

A pneumatic starter (10) incorporates a pawl and ratchet clutch assembly (50) having a ratchet member (46) mounted to a drive member (40) powered by an air expansion turbine (20), and a plurality of ferromagnetic pawls (48) disposed circumferentially about the ratchet member (46) and operable in engagement therewith to transmit rotational drive torque from the drive member (40) to a driven member (60). Each of the pawls (48) is supported for pivotal movement into and out of engagement with the ratchet member (46). Springs (54) are provided for biasing the pawls (48) to pivot radially inwardly into engagement with the ratchet member (46). At least one magnet (82) is disposed in operative association with and radially outwardly of each pawl (48), whereby the ferromagnetic pawls (48) are held by the magnets (82) out of engagement with the ratchet member (46) when the driven shaft (60) is rotating at a speed above a desired reengagement speed.

2 Claims, 2 Drawing Sheets

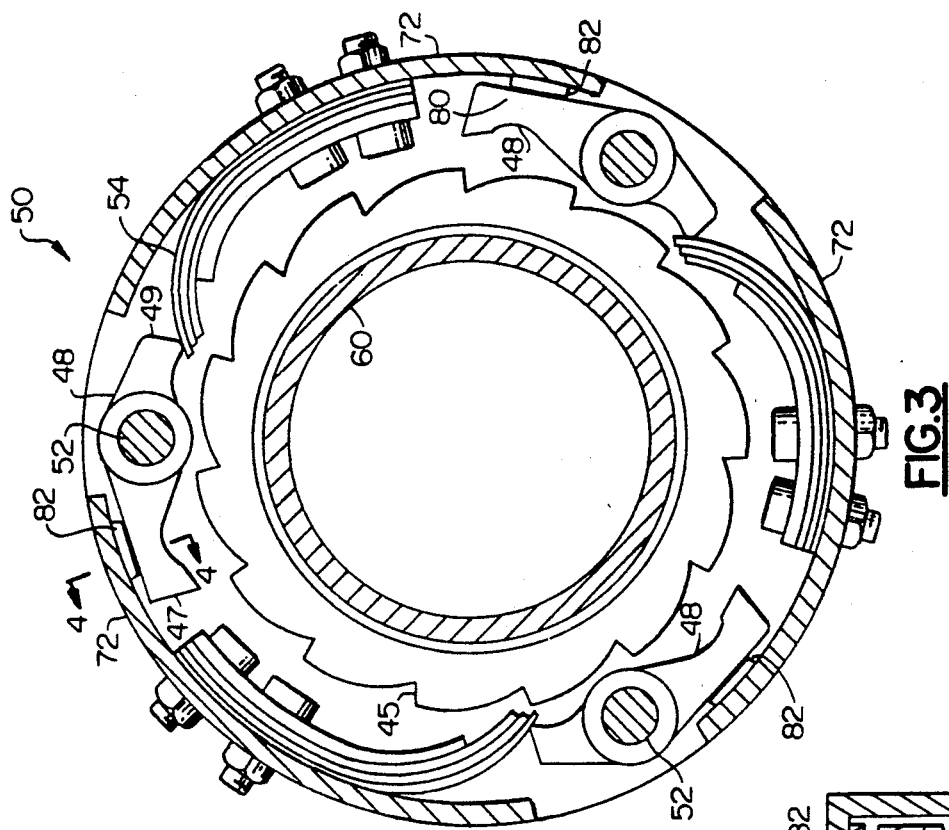
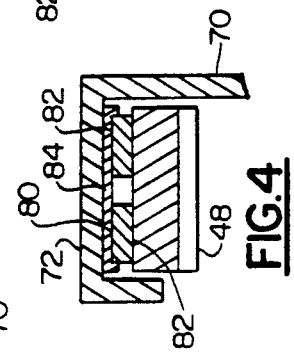
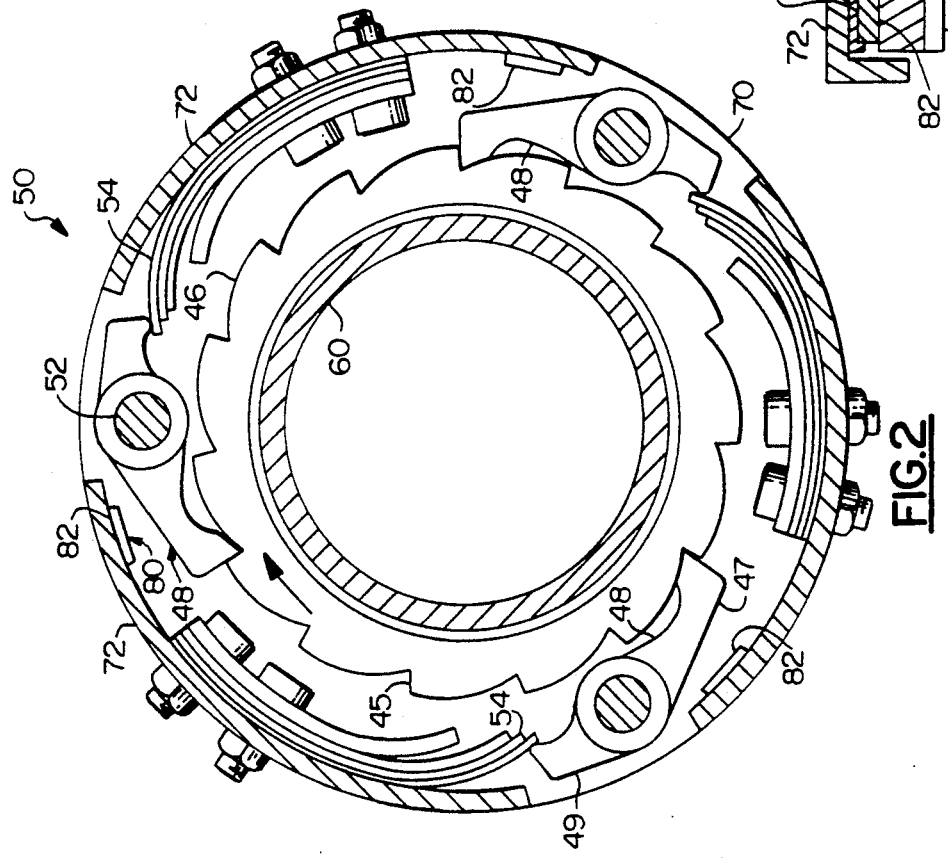

PAWL AND RATCHET CLUTCH WITH PAWL HOLDBACK

TECHNICAL FIELD

The present invention relates generally to pawl and ratchet clutches for use on unidirectional drive systems, and more specifically to a pawl holdback means for retarding reengagement of the pawl with the ratchet. The pawl and ratchet clutch of the present invention is particularly suitable for use in starters for starting engines, such as aircraft turbine engines.

BACKGROUND ART

Pawl and ratchet clutches are often utilized in unidirectional drive systems for transmitting drive torque from a drive shaft to a driven shaft. For example, starters of the type commonly used to start engines, in particular the turbine engines of modern gas turbine powered aircraft often employ a pawl and ratchet type clutch which functions to transmit rotational drive torque from a drive shaft of the starter to drive the engine being started to starting speed. One of type of starter often employing a pawl and ratchet clutch is the pneumatic starter, also known as an air turbine starter, such as disclosed, for example, in U.S. Pat. Nos. 3,727,733; 4,899,534; 4,914,906; and 4,926,631.

A pawl and ratchet clutch of type commonly used in such pneumatic starters includes a toothed ratchet member mounted on a central drive shaft and a plurality of pivotal pawls supported from and rotating with a driven output shaft disposed coaxially about the drive shaft. The pawls are operatively disposed at circumferentially spaced intervals about the ratchet member in cooperative relationship therewith. Each pawl is biased to pivot radially inwardly by a leaf spring operatively associated therewith to engage a tooth of the ratchet member thereby coupling the drive shaft in driving relationship to the driven output shaft so long as the pawls remain engaged with the teeth of the ratchet member. The drive shaft is connected, either directly or through suitable reduction gearing as desired, to the shaft of the pneumatic starter turbine, which is powered by extracting energy from a flow of pressurized fluid passed through the turbine of the starter.

To start the turbine engine, the output end of the driven output shaft of the starter is connected, for example by mating splines, to an engine shaft operatively connected to the main engine shaft through a gear box, and pressurized fluid, typically compressed air, is passed through the turbine of the pneumatic starter. As the starter turbine extracts energy from the compressed air passing therethrough, the drive shaft of the starter turbine is rotated to in turn rotatably drive the output shaft of the starter, and consequently the turbine engine shaft connected thereto, through the engagement of the pawls pivotally mounted to the output shaft with the ratchet member mounted to the drive shaft. Typically, the starter is designed to accelerate the engine shaft from zero to a predetermined cut-off speed, typically of about 5000 revolutions per minute, in about one minute or less.

Once engine light-off has occurred and the engine shaft is rotating at the desired cut-off speed, the flow of pressurized air to the starter turbine is terminated. With the flow of pressurized air to the starter turbine shut-off, the drive shaft of the starter rapidly slows down. Consequently, the ratchet member mounted to the starter drive shaft also rapidly slows down, while the pawls supported from the starter output shaft continue to rotate with the engine of the operating turbine engine at the relatively high cut-off speed. The pawls become disengaged from the ratchet member when the rotational speed of the output shaft exceeds a threshold speed whereat the pawls lift-off of the ratchet member, that is pivot radially outwardly out of contact with the teeth of the ratchet member, under the influence of the centrifugal forces acting thereon due to the continued rotation of the pawls at the relatively high speed of the engine shaft and remain disengaged from the ratchet member so long as the rotational speed of the engine shaft remains high enough that the centrifugal forces acting on the pawls exceed the opposing moment imposed on the pawls by the force of their associated bias springs.

When the turbine engine is later shut-down, the operating speed of the engine shaft of the turbine engine to which the output shaft of the starter is connected rapidly decreases as the turbine engine spools down. As the starter shaft slows down, the centrifugal force on the pawls consequently decreases and the force of each bias spring progressively pivots its associated pawl radially inwardly again toward the ratchet member until each pawl reengages a ratchet tooth on the non-rotating ratchet member so as to reengage the clutch. The speed at which the reengagement of the pawls with the ratchet member occurs, commonly referred to as the reengagement speed, is less than the pawl lift-off speed by an amount commonly referred to as the clutch hysteresis.

In prior art pawl and ratchet clutches, pawl reengagement often occurs at too high of a rotational speed, which results in the pawls undesirably ratcheting along the teeth of the ratchet member before becoming engaged therewith. Such ratcheting causes undesirable wear of the pawls and teeth of the clutch, necessitating premature repair or replacement of the clutch assembly. Additionally, the repeated bouncing of the pawls during ratcheting can set up an undesirable vibration in the starter which can detrimentally impact bearings, gears and shaft members throughout the starter. It would be desirable, therefore, to delay reengagement of the pawls with the ratchet teeth until the rotational speed of the driven shaft has slowed to a lower speed at which the occurrence of such ratcheting is eliminated or at least substantially reduced, thereby reducing wear on and increasing the service life of the clutch assembly.

DISCLOSURE OF INVENTION

It is an object of the present invention to provide a pawl and ratchet clutch having means for holding the pawls thereof in the disengaged position so as to retard the reengagement of the pawls with the ratchet teeth during spool down until the occurrence of pawl ratcheting is eliminated or at least substantially reduced, thereby reducing wear on the clutch assembly.

It is an object of a particular embodiment of the present invention to provide a pawl and ratchet clutch having magnetic pawl holdback means for holding the pawls thereof in the disengaged position so as to retard the reengagement of the pawls with the ratchet teeth during spool down until the occurrence of pawl ratcheting is eliminated or at least substantially reduced.

Accordingly, the pawl and ratchet clutch assembly of the present invention comprises ratchet means mounted to a drive member, a plurality of pawls disposed circumferentially about the ratchet means and operable in engagement therewith to transmit rotational drive torque from the driving member to a driven member to which the pawls are mounted, and holdback means operatively associated with the pawls for retarding radially inward pivoting of the pawls when the driven shaft is rotating at a speed above a desired reengagement speed. Each of the pawls is supported for pivotal movement into and out of engagement with said ratchet means. Spring means are provided for biasing said pawls to pivot radially inwardly into engagement with said ratchet member.

In a preferred embodiment, the pawls are made of a ferromagnetic material and the holdback means comprise a plurality of magnets, there being provided at least one magnet in operative association with each pawl, with each of the magnets being disposed radially outwardly of its associated pawl whereby the ferromagnetic pawls are held by the magnets out of engagement the said ratchet means when the driven shaft is rotating at a speed above a desired reengagement speed.

BRIEF DESCRIPTION OF DRAWINGS

The aforementioned and other objects, features and advantages of the present invention will become more apparent in light of the following detailed description of the invention and the embodiment thereof illustrated in the accompanying drawing, wherein:

FIG. 2 is a sectional side elevational view of the pawl and ratchet assembly of the present invention taken along line 2—2 of FIG. 1 showing the pawls engaged with the ratchet member; and FIG. 3 sectional side elevational view of the pawl and ratchet assembly of the present invention taken along line 2—2 of FIG. 1 showing the pawls disengaged from the member; and FIG. 4 is a cross-sectional view taken along line 4—4 of FIG. 3.

BEST MODE FOR CARRYING OUT THE INVENTION

Figure 1:
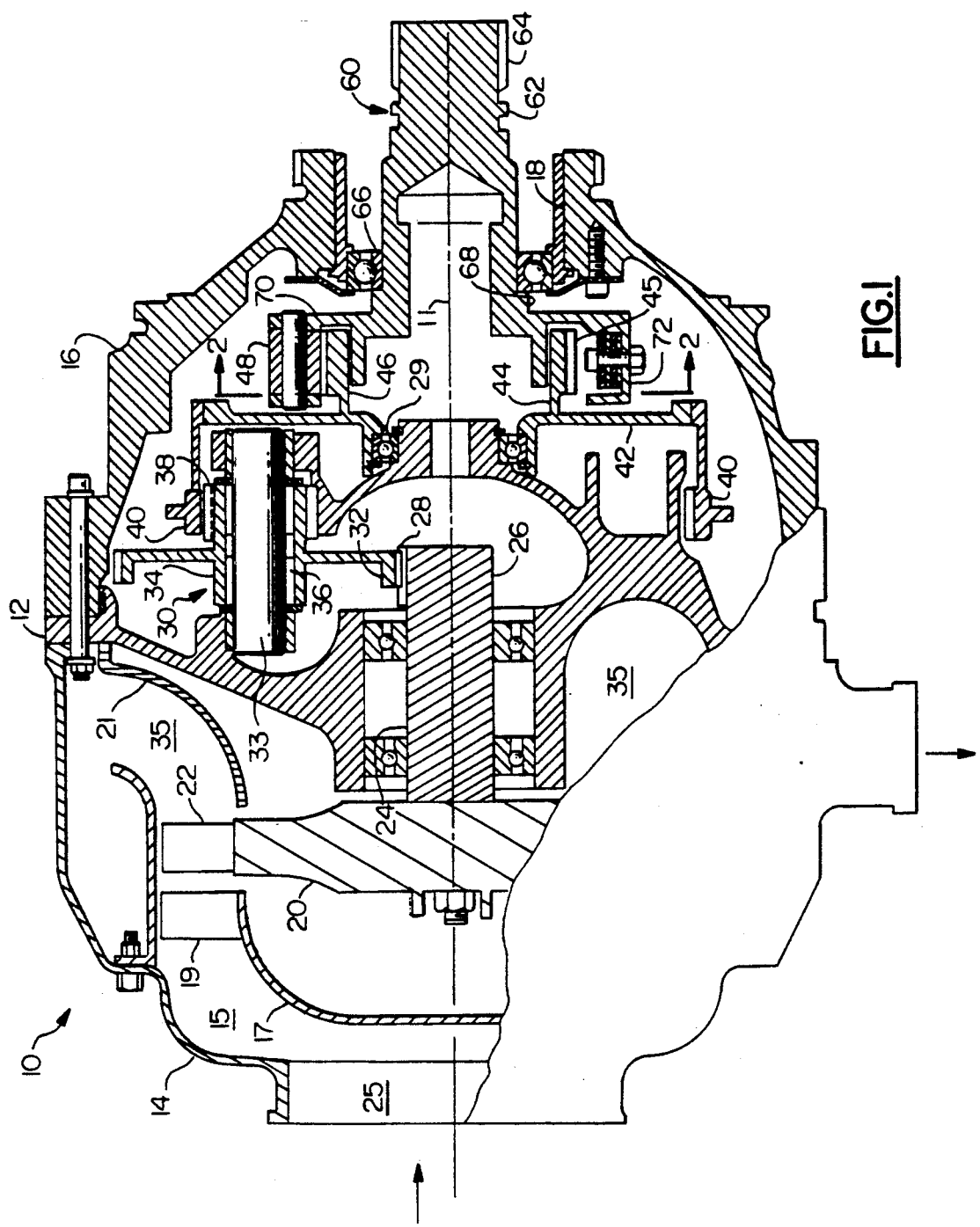
FIG. 1 is a partially-sectioned side elevational view of a pneumatic starter having a pawl and ratchet assembly incorporating pawl holdback means.

Referring now to FIG. 1, there is depicted therein a pneumatic starter 10 of the general type often utilized to start gas turbine engines, such as for example aircraft turbine engines. The pneumatic starter 10, also known as an air turbine starter, includes a turbine wheel 20 which is driven by a compressed gas, most commonly compressed air from an external supply, passing therethrough so as to extract energy from the gas and convert the extracted energy to mechanical energy in a manner well known in the art. Although the present invention is described herein with reference to an air turbine starter, it is to be understood that the pawl and ratchet assembly of the present invention has application on any unidirectional drive system wherein a pawl and ratchet clutch is utilized to transmit rotation from a driving shaft to a driven shaft.

The pneumatic starter 10 has a gear housing 12 disposed between and mounted to an inlet housing 14 and a transmission housing 16. The inlet housing 14 defines a flow chamber 15 having an axial flow inlet 25 and an annular flow outlet 35. Disposed within the flow chamber 15 intermediate therebetween is turbine wheel 20 having a plurality of blades 22 disposed about its outer circumference and a central axially extending shaft 24. The turbine wheel 20 is mounted to its shaft 24 such that the shaft 24 is driven in rotation about its axis as the turbine wheel 20 is caused to rotate by the compressed air supplied from an external source thereof to the flow inlet 25 and passing through the turbine blades 22 to the flow outlet 35. A turbine shield 17, having a plurality of stator vanes 19 disposed circumferentially thereabout, may be disposed within the flow chamber 15 upstream of the turbine wheel 20 to ensure that the incoming compressed air is properly directed through the turbine blades 22 in a desired manner. A flow deflector 21 may be disposed downstream of the turbine wheel 20 to direct the exhaust from the turbine blades 22 to the flow outlet 35.

The energy extracted from the compressed air via the turbine wheel 20 is transmitted through the turbine shaft 24 to drive one or more transmission gear assemblies 30, for example three transmission gear assemblies disposed at equal circumferentially spaced intervals about the end 26 of the turbine shaft 24. Each gear assembly 30 comprises a drive gear 32 on one end of a central support shaft 34 rotatably supported via bearing means 36, for example roller bearings, on a stationary shaft 33, and a pinion gear 38 also provided on the support shaft 34 on the other end thereof. Advantageously, the drive gear 32, the pinion gear 38 and support shaft 34 may be formed as a single integral member. The drive gear 32 of each gear assembly 30 is operatively connected via intermeshing teeth members to a sun gear 28 provided on end 26 of the turbine shaft 24 and the pinion gear 38 of each gear assembly 30 is operatively connected via intermeshing teeth members to a ring gear 40.

The ring gear 40 is carried on and extends axially inwardly from the outer circumference of a radially extending central support member 42 which is rotatably supported on bearings 38 carried on a central strut of the gear housing 12. Also carried by the central support member 42 is a cylindrical flange member 44 which extends coaxially outwardly therefrom about the axis 11. The cylindrical flange member 44 has a plurality of rake teeth 45 formed on its outer circumference so as to form a ratchet member 46 which in cooperation with pawls 48 forms a pawl and ratchet clutch assembly 50.

Extending axially outwardly through a central opening 18 in the transmission housing section 16 of the starter 10 and coaxially along the axis 11 thereof, is an output shaft 60 which has a distal end 62 provided with means, such as for example splines 64, for engaging an engine shaft (not shown) in the gear box of the turbine engine (not shown) on which the starter 10 is utilized to start the turbine engine. The output shaft 60 is rotatably supported on bearing means 66 disposed in the central opening 18 and carried on housing section 16. The aforementioned pawls 48, of which there are typically three, are supported on a clutch carrier 70 which extends radially outward from the output shaft 60 at the proximal end 68 thereof. As best illustrated in FIGS. 2 and 3, each of the pawls 48 is pivotally supported on a shaft 52 mounted to and extending axially from the support flange 70 such that the pawls are disposed in cooperation with the ratchet member 46 at equally spaced intervals about the circumference of and in radially spaced relationship from the ratchet member 46.

Additionally, each of the pawls 48 is biased to pivot about its support shaft 52 to rotate the toe end 47 thereof radially inwardly towards the ratchet member 46 under the force of a bias spring 54 mounted to an axial flange portion 72 of the clutch carrier 70. Each bias spring 54 may comprise a leaf spring operatively bearing against the heel end 49 of its associated pawl so as to, in a manner well known in the art, function during operation of the starter 10 to load the toe end 47 of its associated pawl 48 into engagement with the teeth of the ratchet member 46 of the pawl and ratchet clutch to ensure transmission of torque from the ring gear 40 to the output shaft 60 until the output shaft 60 has reached a relatively high desired cut-off speed, for example about 5000 rpm, at which the pawls 48 pivot away from the ratchet member 46 under the influence of centrifugal force after disengagement from the teeth 45 of the ratchet member 46 upon slowing down of the ratchet member 46 after termination of the flow of compressed air through the starter turbine 20. It is to be understood, however, that the bias spring means is not limited to leaf springs bearing upon the heel portion of the pawl, but may comprise any spring means suitably configured and disposed for biasing the toe portion of the pawl 48 radially inwardly toward the ratchet member 46.

When the pawls 48 are engaged with the teeth of the ratchet 46 during operation of the starter 10, the output shaft 60 of the starter, and the engine shaft of the turbine engine connected therewith, are driven in rotation by the ring gear 40 through the engaged pawl and ratchet clutch. The ring gear 40 is driven in rotation about axis 11 by the energy extracted from the compressed air passing through the blades 22 of the turbine wheel 20 via transmission of the rotational torque imparted to the shaft 24 of the turbine wheel 20 through the sun gear 28 to the drive gears 30 and therefrom through the pinion gears 38 to the ring gear 40.

After the shaft of the turbine engine engaged with the output shaft 60 of the starter 10 has reached the preselected desired engine speed, the flow of compressed air to and through the turbine wheel 20 is shut off. As a result, drive power is no longer being delivered to the ratchet member 46 through the drive gears 30 and ring gear 40. Consequently, the ratchet member 46 slows down and its rotational speed rapidly decreases, while the output shaft 60 of the starter 10 and the pawls 48 mounted thereto continue to rotate at the higher engine speed, thereby causing the pawls 48 to become disengaged from the ratchet member 46 and pivot away from the ratchet member 46 as hereinbefore discussed.

When the turbine engine is later shut down, the starter output shaft 60 begins to slow down and its rotational speed steadily decreases as the turbine engine spools down. As the output shaft 60 coasts down, the centrifugal force acting on the pawls 48 so as to urge the toe ends 47 of the pawls 48 radially outwardly steadily decreases and the toe end 47 of each pawl 48 begins to pivot radially inwardly toward the ratchet member 46 under the bias force applied by the springs 54 on the heel ends 49 of the pawls 48 until the toe ends 47 of the pawls 48 re-engage with the teeth of the ratchet member 46.

In accordance with the present invention, there is disposed on each extension flange member 72 in cooperative arrangement with an associated pawl, means 80 for holding the pawl 48 associated therewith out of engagement with the ratchet member 46. The holdback means 80 augment the centrifugal force acting on each of the pawls 48 and oppose the bias force imposed upon each pawl 48 by its associated spring 54. Thus, the holdback means 80 serve to retard the radially inward pivoting of the pawls 48 until the output shaft 60 of the starter has coasted down to a lower rotational speed whereat the effective force of the bias springs 54 on their associated pawls 48 overcomes the combined counteraction of the holdback means 80 and the reduced centrifugal force on the lower rotational speed so as to pivot the toe ends 47 of the pawls 48 back into engagement with the teeth 45 of the ratchet member 46. As the reengagement speed is substantially decreased by the restraining force imposed upon the pawls 48 by the holdback means 80 associated therewith, the occurrence of pawl ratcheting during reengagement, and the undesired wear caused thereby, is eliminated or at least substantially reduced.

Most advantageously, the pawls 48 are made of a ferromagnetic material, such as for example carbon steel, and the holdback means 80 comprise a plurality of magnetic slabs 82 of a magnetic material, such as for example samarium cobalt, with at least one magnetic slab 82 being disposed on each flange portion 72 of the clutch carrier 70 and positioned such that the toe end 47 of its associated pawl 48 comes in contact with the surface of the magnetic slabs 82 when the output shaft 60 of the starter 10 is rotating at such a speed that the centrifugal force imposed on the pawls causes the toe end 47 of each pawl 48 to pivot about its pawl support shaft 52 radially outwardly away from the ratchet member 60. Once the toe ends 47 of the pawls 48 come on contact with their associated magnetic slabs 82, the magnetic attraction therebetween holds each of the pawls 48 out of engagement with the teeth of the ratchet member 46 thereby augmenting the effect of centrifugal force on the pawls 48. The hysteresis of the clutch assembly, i.e. the difference between the pawl lift-off speed and the pawl reengagement speed, is thereby increased as reengagement of the toe ends 47 of the pawls 48 with the teeth 45 of the ratchet member 46 is retarded until the rotational speed of the starter output shaft 60 slows to a relatively low speed at which reengagement occurs without substantial pawl ratcheting.

As illustrated in FIG. 4, each of the holdback means 80 may comprise a pair of magnetic slabs 82 supported in spaced relationship on a magnet carrier 84 mounted to the axial flange portion 72 of the clutch carrier 70. The magnet carrier 84 is made of a ferromagnetic material and therefore acts as a shunt whereby the lines of magnetic flux between the spaced magnetic slabs 82 pass through the magnet carrier 84 as well as through the pawl 48 in contact therewith.

Irrespective of configuration, the magnetic holdback means 80 of pawl and ratchet clutch assembly of the present invention functions through magnetic attraction to hold the ferromagnetic pawls 48 in disengagement from the ratchet member 46, thereby augmenting the centrifugal forces acting on the pawls 48 and retarding reengagement of the pawls 48 with the non-rotating ratchet member 46 until the starter output shaft 60 has slowed to a lower rotational speed at which the centrifugal forces generated are insufficient, even when augmented by the magnetic attraction forces, to overcome the opposing moment of the spring bias force on the pawl and can no longer retain the pawls 48 in disengagement. However, because the reengagement has been delayed until a lower rotational speed, the pawls are rotating much slower when reengaged occurs. Consequently, pawl ratcheting is substantially reduced, if not eliminated, thus reducing undesirable wearing of the pawls and the ratchet teeth experienced on prior art pawl and ratchet clutches prone to ratcheting. Further, at a lower reengagement speed, the pawls 48 will have a greater tendency to smoothly snap into engagement with the ratchet teeth 45, rather than bounce of the ratchet member 46 as experienced on prior art pawl and clutches.

Although the invention has been shown and described with respect to a best mode embodiment exemplary thereof, it should be understood by those skilled in the art that various modifications, changes, omissions and additions in the form and detail thereof may be made without departing from the spirit and scope of the invention.

We claim:

1. A pawl and ratchet clutch assembly for use in transmitting rotational drive torque from a driving member to a driven member, said pawl and ratchet clutch assembly comprising ratchet means mounted to the drive member, a plurality of ferromagnetic pawls disposed circumferentially about said ratchet means and operable in engagement therewith to transmit the rotational drive torque from the driving member to the driven member, each of said pawls being pivotally supported for movement into and out of engagement with said ratchet means, spring means for biasing said pawls to pivot radially inwardly into engagement with said ratchet means, and holdback means operatively associated with said pawls for retarding said pawls from pivoting inwardly when said driven shaft is rotating at a speed above a desired reengagement speed, said holdback means comprising a plurality of magnets with at least one magnet being operatively associated with each of said pawls, each of said magnets disposed radially outwardly of its associated pawl whereby said ferromagnetic pawls are held by said magnets out of engagement with said ratchet means.

2. A pawl and ratchet assembly as recited in claim 1 wherein each of said holdback means comprises a pair of magnets supported in spaced relationship in a carrier member disposed radially outwardly of its associated pawl, said carrier member being made of a ferromagnetic material.

* * * * *